(12) United States Patent
Broyles et al.

(10) Patent No.: US 8,762,697 B2
(45) Date of Patent: Jun. 24, 2014

(54) PRECLUDING A DEVICE FROM BEING SELECTED TO BOOT A SYSTEM

(75) Inventors: Paul J. Broyles, Houston, TX (US); Jeffrey P. Kenline, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2386 days.

(21) Appl. No.: 11/536,889

(22) Filed: Sep. 29, 2006

(65) Prior Publication Data

US 2008/0104385 A1 May 1, 2008

(51) Int. Cl.
*G06F 9/00* (2006.01)
(52) U.S. Cl.
USPC .......... 713/2; 713/100; 713/183; 726/2
(58) Field of Classification Search
USPC ........... 713/2, 100, 183, 1, 19; 726/2, 19
See application file for complete search history.

(56) References Cited

U.S. PATENT DOCUMENTS

| | | | |
|---|---|---|---|
| 6,161,178 A * | 12/2000 | Cromer et al. ............... | 713/2 |
| 6,567,919 B1 * | 5/2003 | Yanagihara et al. .......... | 726/7 |
| 6,721,883 B1 * | 4/2004 | Khatri et al. ................. | 713/2 |
| 8,601,571 B2 * | 12/2013 | Kim ............................ | 726/20 |
| 2001/0016905 A1 * | 8/2001 | Kasamatsu et al. ......... | 713/100 |
| 2005/0235135 A1 * | 10/2005 | Dao et al. .................... | 713/1 |

OTHER PUBLICATIONS

A Middleware Infrastructure for Active Spaces; Roman et al; University of Illinois at Urbana-Champaign, 2002, IEEE.*

* cited by examiner

*Primary Examiner* — Jason Lee

(57) ABSTRACT

A method comprises receiving user input during a boot process requesting a list of selectable boot devices to be provided from which the user can select one of the devices to boot a system. The method further comprises precluding a function from being performed, the function otherwise permitting a user to select the device to be used to boot the system.

10 Claims, 5 Drawing Sheets

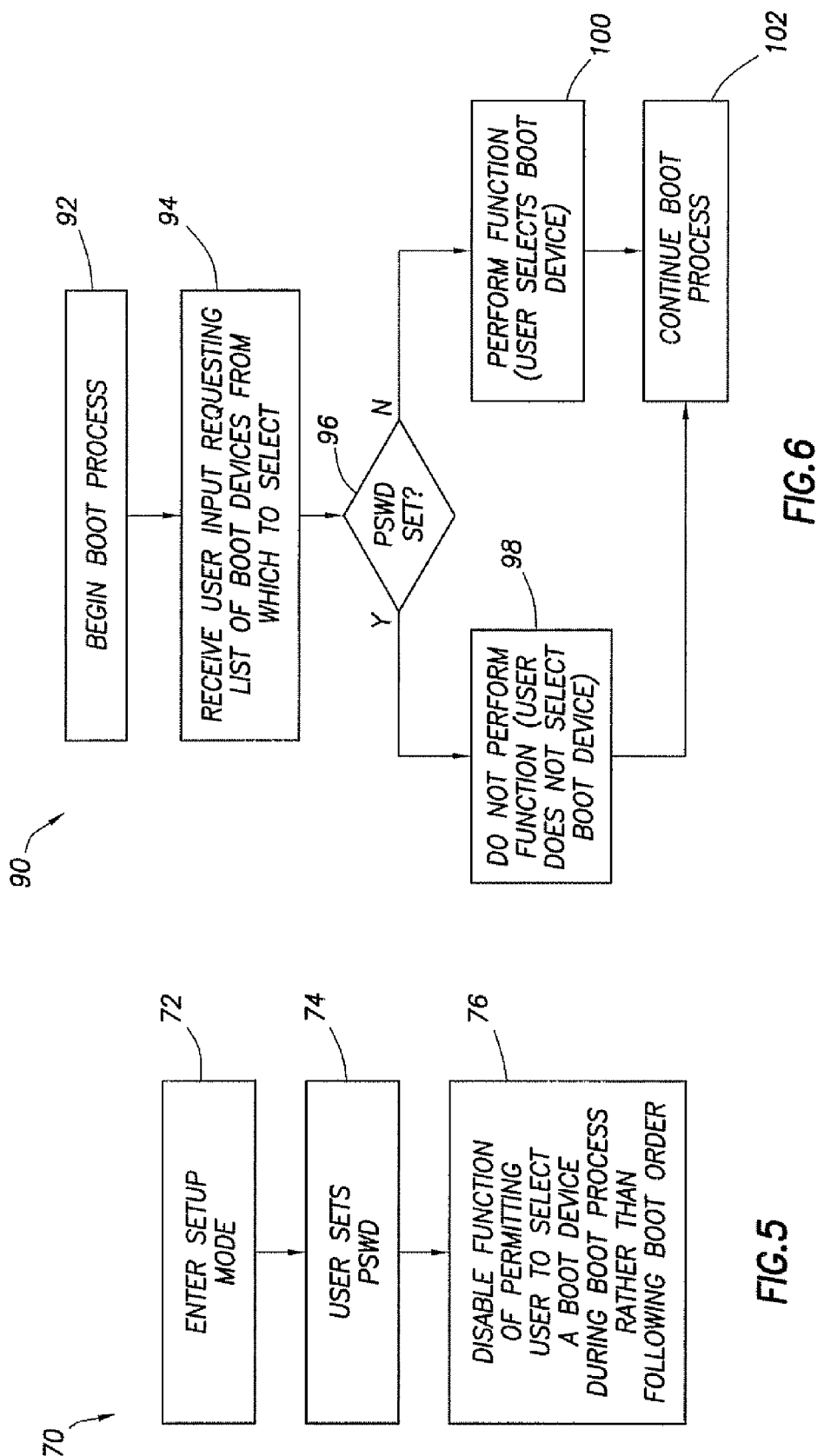

PRECLUDING A DEVICE FROM BEING SELECTED TO BOOT A SYSTEM

BACKGROUND

In many computer systems, multiple bootable devices (e.g., hard drive, floppy drive, etc.) are available to boot the system. Some of such bootable devices (e.g., a floppy drive) can be used to boot the system in an unsecure manner because the contents of some bootable devices are not controlled. For example, a floppy disk might contain code that causes sensitive storage areas of the hard drive to be accessed.

BRIEF DESCRIPTION OF THE DRAWINGS

For a detailed description of exemplary embodiments of the invention, reference will now be made to the accompanying drawings in which:

FIG. 5 shows a method of disabling a function of enabling a user to manually select a boot device in accordance with an illustrative embodiment; and FIG. 6 shows a method of precluding a user from selecting a boot device during a boot process in accordance with an illustrative embodiment.

NOTATION AND NOMENCLATURE

Certain terms are used throughout the following description and claims to refer to particular system components. As one skilled in the ad will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
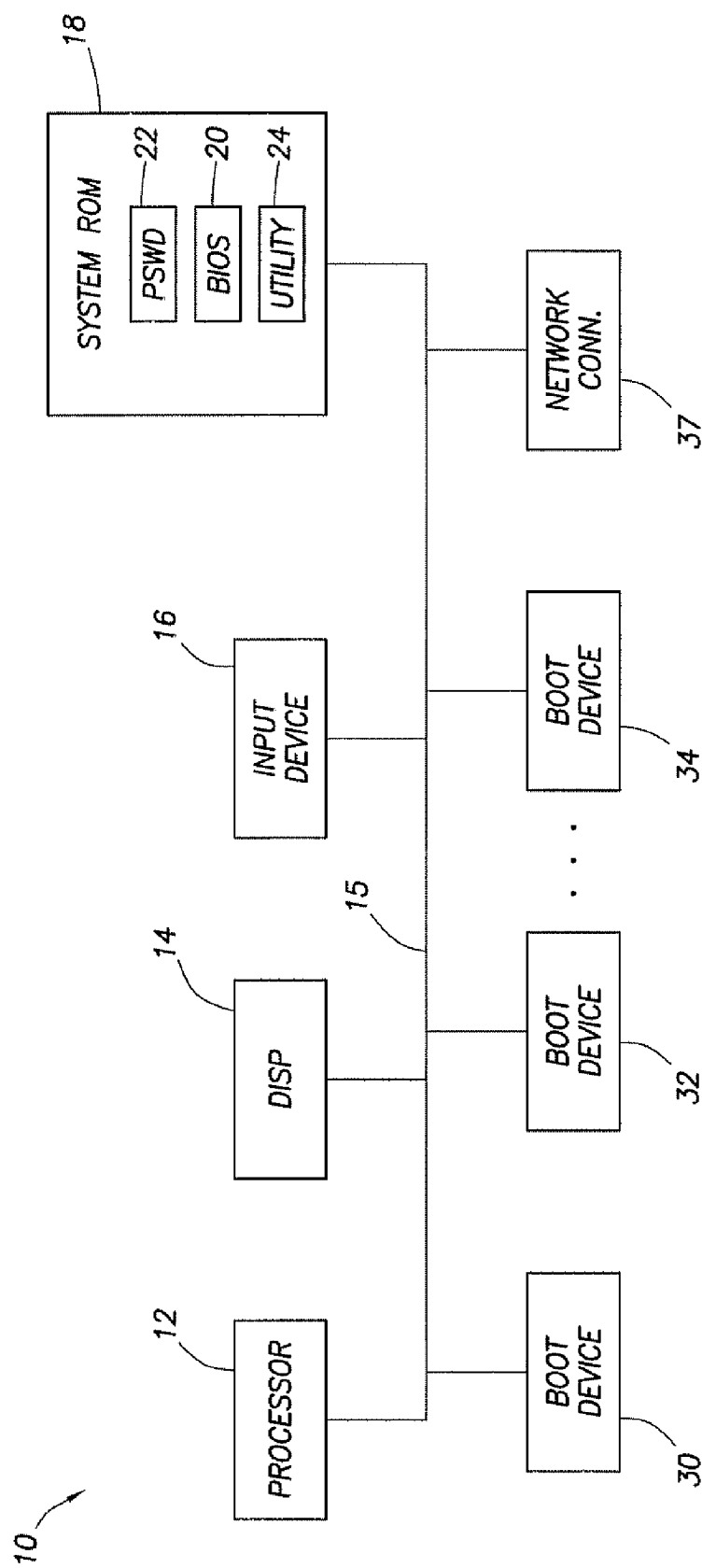
FIG. 1 shows a system in accordance with an illustrative embodiment.

FIG. 1 shows a system 10 comprising a processor 12, a display 14, an input device 16, a system read only memory (ROM) 18, and one or more boot devices 30, 32, and 34 coupled together through a communication infrastructure 15. The communication infrastructure 15 comprises one or more busses, bridge devices, etc. The input device 16 comprises any input device selected from one or more of a keyboard, a mouse, a trackball, a pointing device, etc. A network connection 37 is also provided to permit the system 10 to be connected to a network such as local area or wide area network (e.g., the Internet).

The system ROM 18 comprises a basic input/output system (BIOS) 20, which comprises code executable by the processor 12. The BIOS 20 is stored on system ROM 18 in the embodiment of FIG. 1, but can be stored on any type of computer-readable medium whose software is executed by processor 12. The BIOS 20 causes the processor 12 to perform one or more low level functions of the system 10, such as providing a software interface to peripheral devices. The BIOS 20 also contains code that is executed to boot up, test, and otherwise initialize the system 10.

At or near the beginning of the boot process, the processor 12 begins executing boot code internal to the BIOS 20. At some point, control changes from the BIOS code 20 to code contained on one of the bootable device 30-34. Such bootable devices 30-34 include, for example, a hard drive, a floppy drive, etc. The device 30-34 used to boot the system 10 contains, for example, an instance of an operating system which is loaded and executed by the processor. The system 10 is a computer (e.g., notebook, desktop, server, etc.) or any other type of system that can be booted by one of multiple devices.

Figure 2:
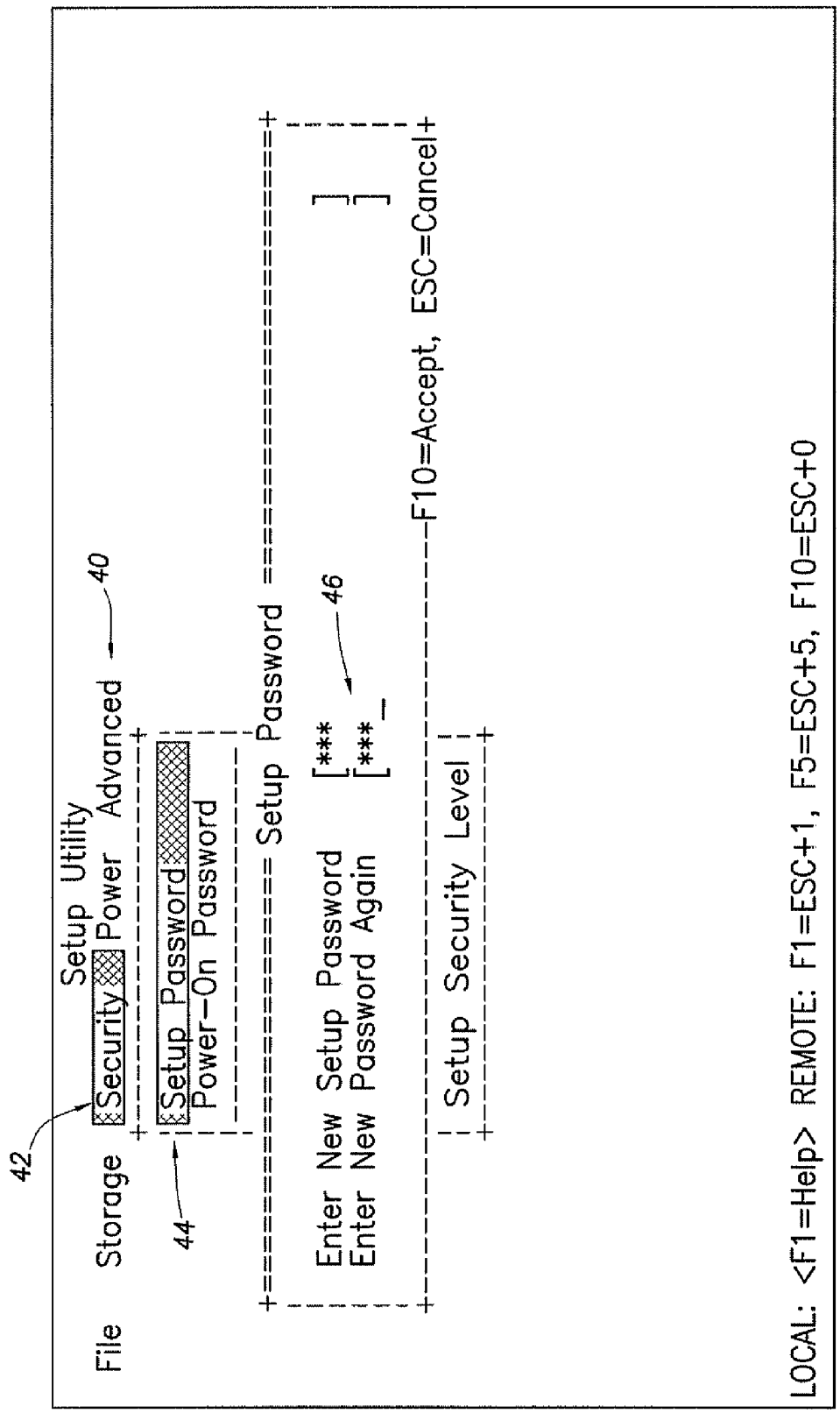
FIG. 2 shows a graphical user interface (GUI) that permits a user to set a password in accordance with an illustrative embodiment.

During a boot process of the system 10, a user can enter a "setup" mode by pressing a pre-designated key or key combination such as the function key F10. At that point, a setup utility 24 is executed by processor 12 to implement the setup mode. Among other functions to which the user has access in the setup mode is the ability to set a password. FIG. 2 illustrates an embodiment of a graphical user interface (GUI) that the user will see on display 14 upon entering the setup mode. Various options 40 are illustrated across the top of the illustrative GUI of FIG. 2. One of the options is the "Security" option 42. Upon selecting the security option, the user is provided an option 44 to set the password. The user will be prompted to enter an alphanumeric value for the password as illustrated at 46 in FIG. 2. As a result of setting the password, the BIOS 20 sets a password bit 22 (FIG. 1) which specifies whether the password feature has been enabled or disabled. "Setting" the password means that, in at least some embodiments, the password feature has been enabled.

The password represents a security mechanism to limit access to change one or more of the various system configuration parameters (e.g., the boot order) that are changeable via the setup mode. Thus, once the password is set, the user will be prompted to enter the password each time upon pressing F10 during the boot process to enter the setup mode. If the user does not enter a valid password, the user will be unable to change any of the configuration parameters available during setup. If the user enters the correct password, the user will be able to change the configuration parameters available during setup. Whether the user will be prompted to enter the password depends on the status of password bit 22.

Figure 3:
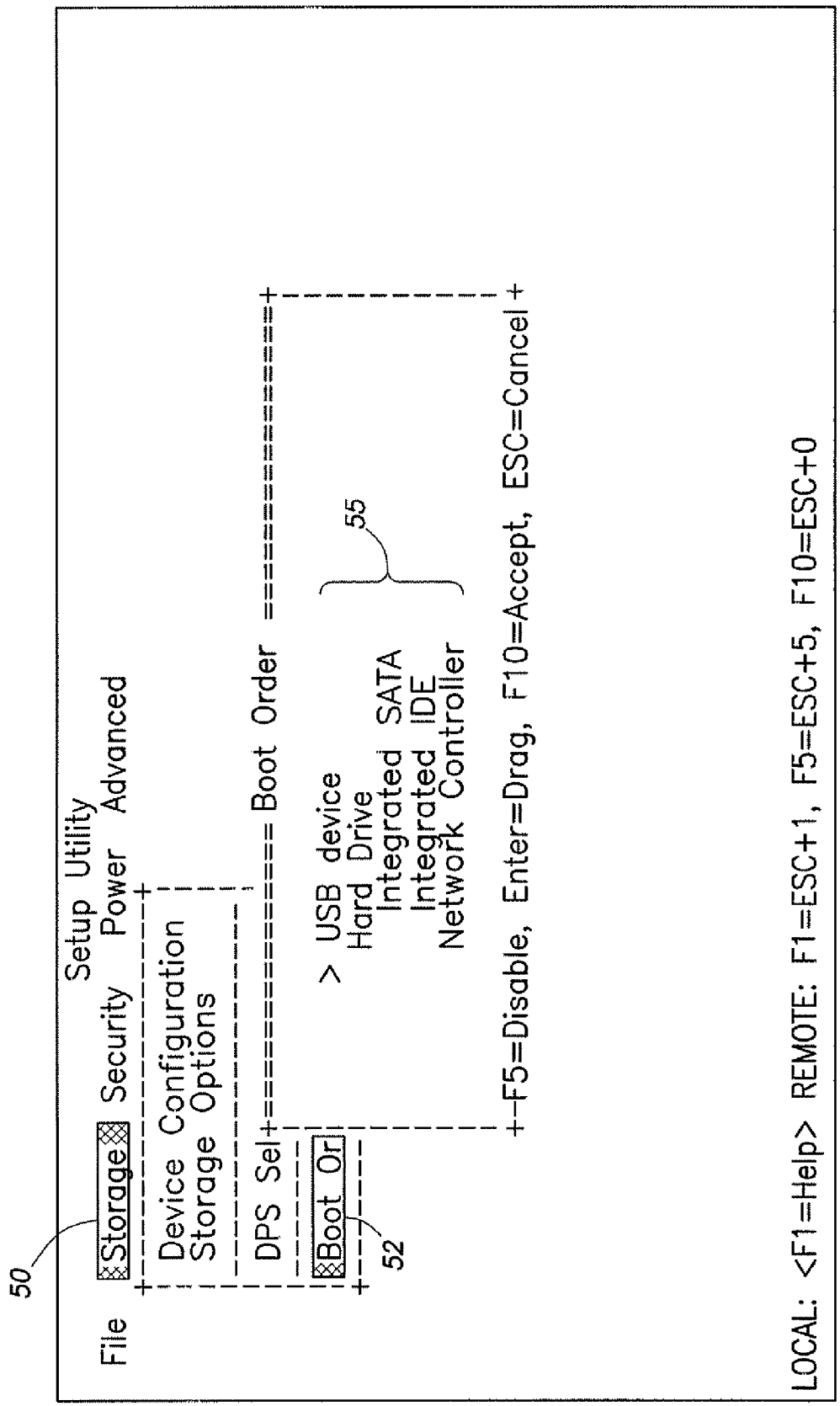
FIG. 3 shows a GUI that permits a user to change a boot order in accordance with an illustrative embodiment.

FIG. 3 illustrates an embodiment of the storage option 50 provided in the setup mode. The storage option 50 provides a list of choices, one of which (option 52) provides the user the ability to specify and/or change a boot order 55. A boot order specifies a list of boot devices (such as devices 30-34) in a particular order that the system 10 should attempt to boot. In the example of FIG. 3, the first device listed in the boot order 55 is a universal serial bus (USB) device. Thus, the system 10 will attempt first to boot from that device, if that device is present. If that device is not present or is not sufficiently functional to boot the system, the next device listed in the boot order 55 (i.e., the hard drive) will be used to boot the system, and so on.

Figure 4:
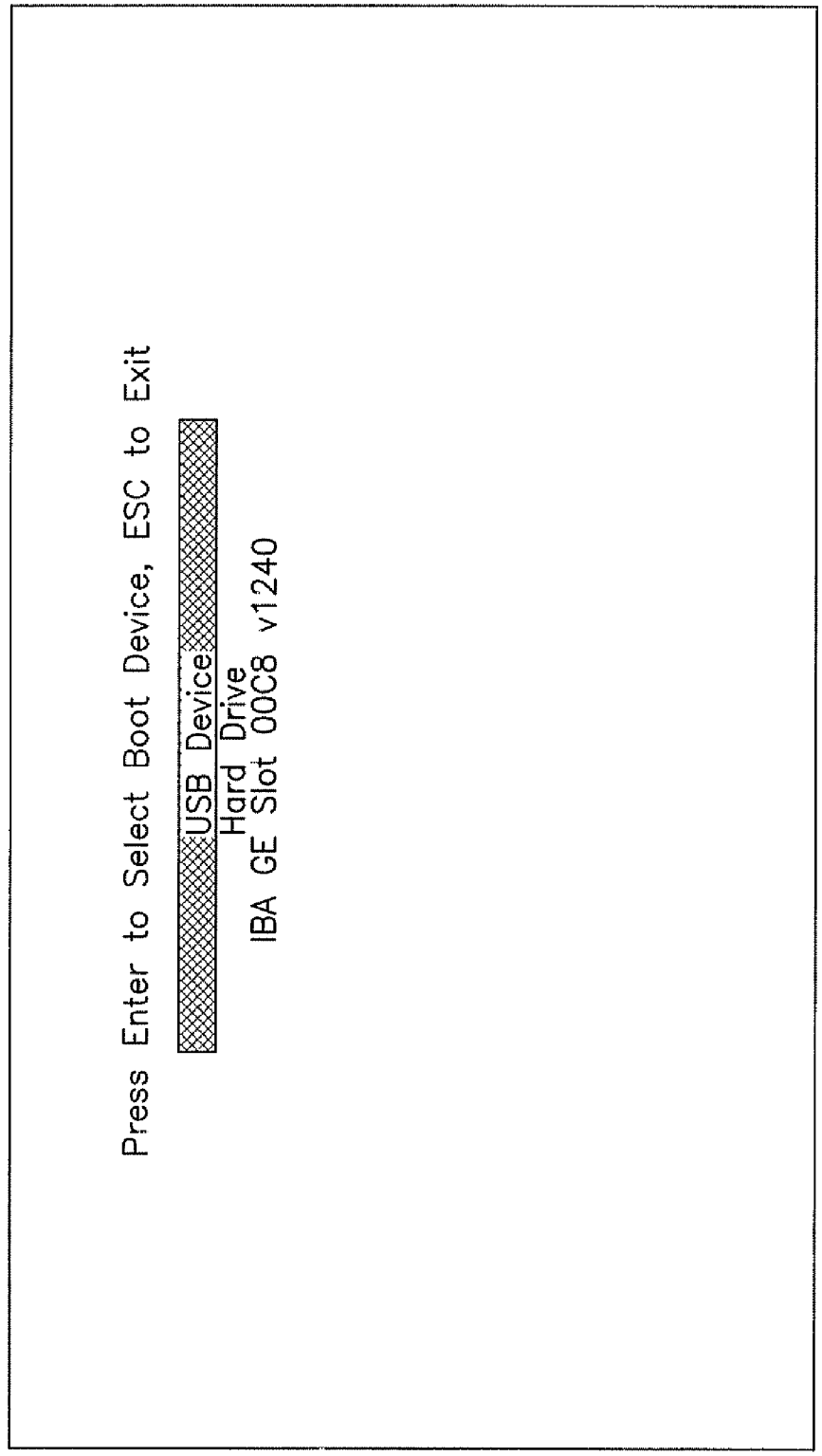
FIG. 4 shows a GUI that permits a user to manually request a particular device to be used to boot the system thereby superseding the specified boot order in accordance with an illustrative embodiment.

Another feature, apart from pressing F10 to enter the setup mode, that is available to the user during a boot process is a feature by which the user can manually select a device to boot the system. This feature is activated by pressing a key or key combination such as F9 in some embodiments. Upon pressing the F9 key, the GUI of FIG. 4 is shown to the user in accordance with various embodiments. The user is provided a list of boot devices from which the user is able to select a device to boot system 10. The selection of such a boot device supersedes any previously stored boot order. The boot device selected in FIG. 4 is used to boot the system only once in at least some embodiments, after which the system reverts back to the previously stored boot order. That is, the GUI of FIG. 4 permits a user to temporarily override a default or previously specified boot order.

In some embodiments, the GUI of FIG. 4 and the associated function performed by which the user selects a boot device superseding the boot order does not require entry of the password that may have been set as described above. That is, the password, if set, is required in at least some embodiments to enter the setup mode (FIGS. 2 and 3), but is not required to select a boot device that supersedes the boot order (FIG. 4). A security issue is potentially created by which a user could manually override a boot order to boot from an unsecure boot device (e.g., a floppy disk). For example, the specified boot order might require a hard drive, if present and functional, to be used to boot the system before any other boot device is attempted to be used. The F9 function key and the GUI of FIG. 4, however, enables anyone to select any available boot device. Of particular concern, of course, is that an unsecure boot device could be used to boot the system.

In accordance with various embodiments, the function by which the user selects a boot device superseding the boot order (FIG. 4) is disabled if the password is set. The underlying assumption is that, if a password has been set and the boot order can only be changed upon entry of a valid password, then a password having been set indicates that a person has been designated to manage the boot order. That being the case, the system's ability to temporarily override the boot order (via, for example, the F9 function key during a boot process) could be used by a different person to boot to an unsecure device thereby potentially causing a security issue. This security issue is addressed by, if a mechanism (e.g., the password) is activated that controls access to various configuration parameters such as the boot order, disabling the function by which the user selects a boot device superseding the boot order. As such, the ability of the system to permit a user to select a boot order (rather than following the boot order) is disabled. If a password is not set for the system, then in at least some embodiments the function by which the user selects a boot device superseding the boot order is not disabled and a user is permitted to select a boot device.

FIG. 5 illustrates an embodiment of a method 70 by which a user sets a password. One or more of the actions listed in FIG. 5 are performed by the BIOS 20. At 72, the setup mode is entered. In some embodiments, the setup mode is entered by pressing the F10 key during a boot process. At 74, a user sets a password for the system. FIG. 2 illustrates the GUI by which the user sets the password. At 74, upon setting the password, the method comprises disabling the function of permitting the user to select a boot device during a boot process rather than following a previously stored boot order. In at least one embodiment, action 74 is performed by setting the password bit 22 (FIG. 1).

FIG. 6 illustrates an embodiment of a method 90 precluding a user from selecting a boot device during a boot device without entry of the password. At 92, the system begins the boot process. This action may be performed by, for example, the user powering on the system or by a signal received over the network connection 37. At 94, an input is received from a user requesting a list of boot devices to be provided to the user from which the user can select a device to boot the system 10. In at least some embodiments, this input is the activation of the F9 key, or whatever mechanism is used to cause the system 10 generate the GUI of FIG. 4. At 96, the system 10 determines whether the password has been set, which in some embodiments is determined by examining the state of password bit 22 (FIG. 1). If a password has been set, the function by which the user selects a boot device superseding the boot order is not performed (98) and the boot process continues at 102. If, however, a password has not been set, then the function by which the user selects a boot device superseding the boot order is performed at 102 after which the boot process continues (102). The function performed in accordance with 100 may comprise the user being prompted to enter the password.

In FIG. 6, the boot device selection function is not performed if the password is set. In other embodiments, the boot device selection function is permitted to be performed, but only upon the user entering a valid password. That is, the user would be prompted to enter the password. If the user does not enter a valid password, the boot device selection function is not performed; otherwise the boot device selection function is performed.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
receiving user input during a boot process requesting a list of selectable boot devices to be provided from which the user can select one of said devices to boot a system; and
based on a security mechanism being activated that limits access to changing a boot order, precluding a function from being performed, the function otherwise permitting a user to select the device to be used to boot the system;
wherein the mechanism comprises determining if a password has been set.

2. The method of claim 1 further comprising setting a bit associated with a basic input/output system (BIOS), said bit specifies that a password has been set.

3. The method of claim 1 further comprising setting the password.

4. The method of claim 1 wherein said function, if not precluded, enables a user to select a boot device that is applicable to booting said system.

5. The method of claim 1 wherein receiving the user input comprises detecting activation of an F9 function key.

6. A system, comprising:
a processor that implements a boot order of devices to boot the system, said boot order being protected via a security mechanism that includes setting a password;
wherein, if, during a boot process, a user requests a list of selectable boot devices to be provided from which the user can select one of said devices to boot the system thereby superseding the boot order, the processor precludes the user from being able to select a boot device if the password has been set.

7. The system of claim 6 further comprising a basic input/output system (BIOS) and wherein said processor precludes the user from selecting the boot device by setting a bit associated with the BIOS.

8. The system of claim 6 further comprising a keyboard coupled to said processor, said keyboard comprising an F9 function key, and wherein said request comprises an activation of the F9 function key.

9. A non-transitory computer-readable medium containing software that, when executed by a processor, causes the processor to:
   receive user input during a boot process requesting a list of selectable boot devices to be provided from which the user can select one of said devices to boot a system;
   cause a password to be set in order for a boot order to be changed; and
   as a result of the boot order being password protected, preclude a user from manually selecting a device to be used to boot the system.

10. The computer-readable medium of claim 9 wherein the software causes the processor to enable the user to manually select a boot device when the boot order is not password protected.

\* \* \* \* \*